Figure 1:
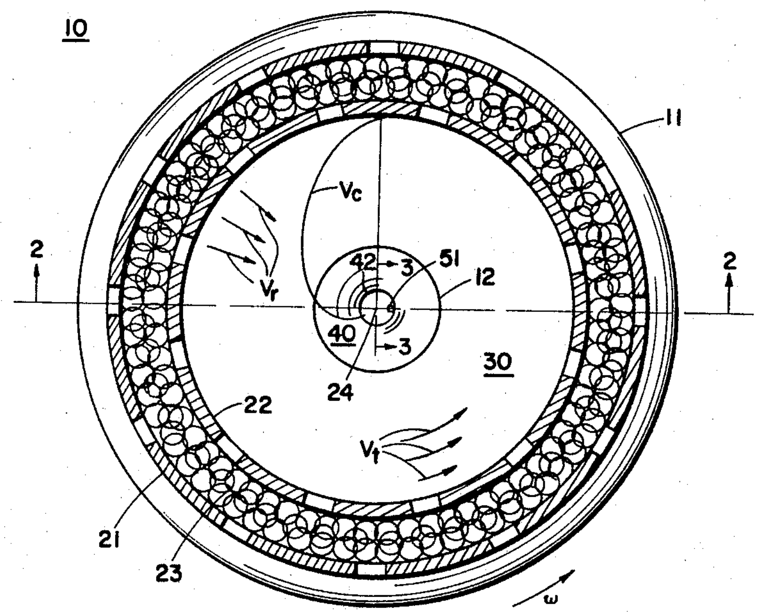

May 16, 1967 R. HERMANN 3,319,471

PICKOFF MEANS FOR FLUID VORTEX RATE SENSOR

Filed Dec. 5, 1961 2 Sheets-Sheet 1

INVENTOR.
RUDOLF HERMANN

BY Roger W. Jensen

ATTORNEY.

PICKOFF MEANS FOR FLUID VORTEX RATE SENSOR
Filed Dec. 5, 1961 2 Sheets-Sheet 2
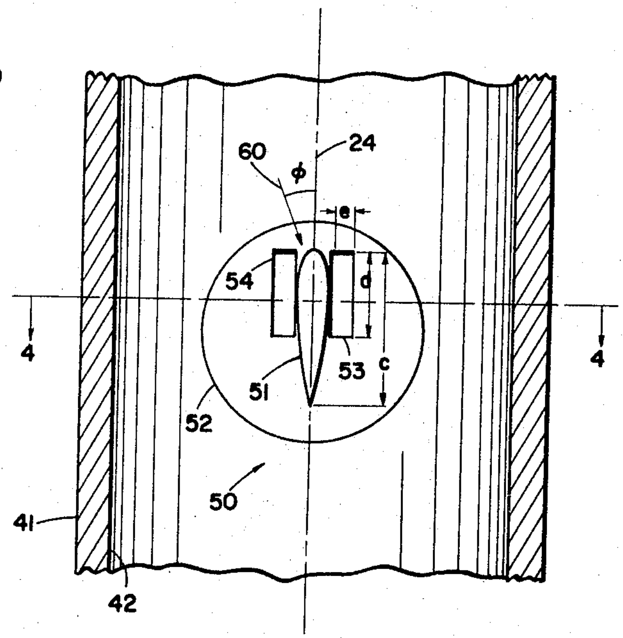
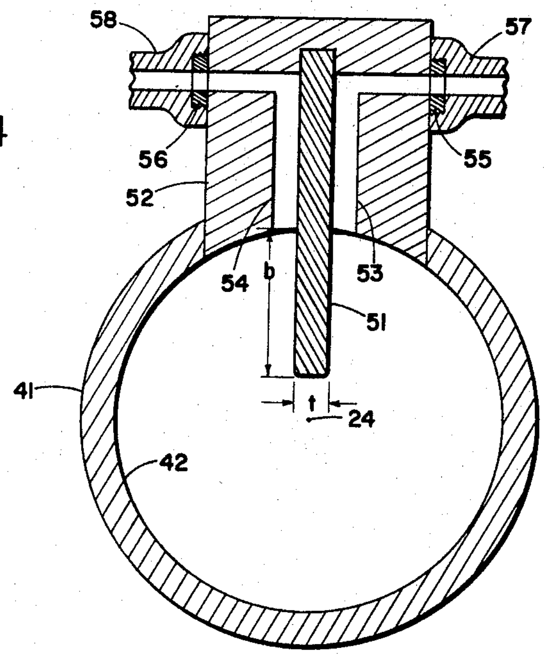
INVENTOR.
RUDOLF HERMANN
BY Roger W. Hensen
ATTORNEY.

United States Patent Office 3,319,471

Patented May 16, 1967

3,319,471

PICKOFF MEANS FOR FLUID VORTEX RATE SENSOR

Rudolf Hermann, St. Paul, Minn., assignor to Honeywell Inc., a corporation of Delaware Filed Dec. 5, 1961, Ser. No. 157,142
3 Claims. (Cl. 73—505)

This invention relates to fluid flow sensors and more particularly to pressure responsive fluid flow sensors.

This invention has special application to angular velocity or rate sensing instruments commonly referred to by those skilled in the art as a vortex rate sensor, although the invention is by no means limited to such an application.

However to provide a clear understanding of the applicant's invention, it will be described as applied to a vortex rate sensor. A vortex rate sensor is an apparatus which is capable of sensing the angular velocity (rate) about an axis of a body upon which the vortex rate sensor is applied. The measurement of angular velocity (rate) is, as is well understood, useful and/or necessary in many control systems. For example an angular rate signal is very useful for control purposes in automatic flight and/or attitude control systems of aircraft and space craft. A vortex rate sensor generally comprises a device which provides a fluid flow field which is analogous to a classical two-dimensional pure sink flow in the absence of an input rate. The fluid in such a pure sink flow has only radial velocity. When the vortex rate sensor is subjected to an angular velocity about the input axis, a tangential or rotational velocity is imparted to the fluid. The tangential or rotational flow is described by a pure vortex flow. The pure vortex flow of the fluid is superimposed upon the pure sink flow and results in a combined vortex-sink flow in which the fluid streamline pattern is a logarithmic spiral.

It should be noted that the radial velocity of a fluid in a pure sink flow will increase as the fluid approaches the sink (also referred to as the core, bore, passage, or exit tube) because of the narrowing of the streamlines of the fluid. Also, the tangential or rotational velocity of a fluid in a pure vortex flow will increase as the fluid approaches the sink because of the principle of conservation of momentum. It follows that the velocity of a fluid in a combined vortex-sink flow increases as the fluid approaches the sink. Thus the vortex rate sensor possesses a characteristic of amplification of the parameter to be sensed within the sensing element itself. Various amplification levels may be obtained by varying the geometry of the vortex rate sensor.

As pointed out above, an angular velocity input about the input axis of the vortex rate sensor results in the superpositioning of a pure vortex flow upon a pure sink flow by imparting a rotational or tangential velocity to the fluid of the vortex rate sensor. Consequently, by sensing the effect of the angular velocity input upon the fluid flow of the vortex rate sensor with suitable means, one may obtain a measure of the input rate.

One such rate measuring means is disclosed in the copending application Ser. No. 156,613, filed Dec. 4, 1961, in the name of Richard J. Reilly, and assigned to the same assignee as the present application. The copending application discloses a fluid flow sensor utilizing a blade element positioned between two pressure ports. The pressure differential across the blade element is indicative of the fluid flow pattern.

The applicant has provided an improved pressure responsive fluid flow sensor which substantially eliminates any unsteady fluctuations and/or aerodynamic noise which provides a signal indicative of the nature of the fluid flow and which might otherwise be in the output signal. The signal provided by the applicant's invention, of course, may be utilized to control any apparatus which requires such information. The applicant's unique fluid flow sensor utilizes a flow pattern amenable to theory so that the optimum dimensions of the sensor can be determined as a function of the flow variables and the geometric parameters. In addition, the applicant has substantially reduced the time lag inherent in pressure responsive fluid flow sensors. The applicant obtains these vast improvements by positioning a streamline element within the fluid flow field and sensing the pressure differential across such an element. The streamline element in one particular embodiment of the applicant's invention takes the form of a symmetrical airfoil element. The pressure differential across the streamline element of this improved pressure responsive fluid flow sensor is indicative of the flow pattern of the fluid.

It is an object of this invention to provide an improved pickoff means for a fluid vortex rate sensor.

Figure 2:
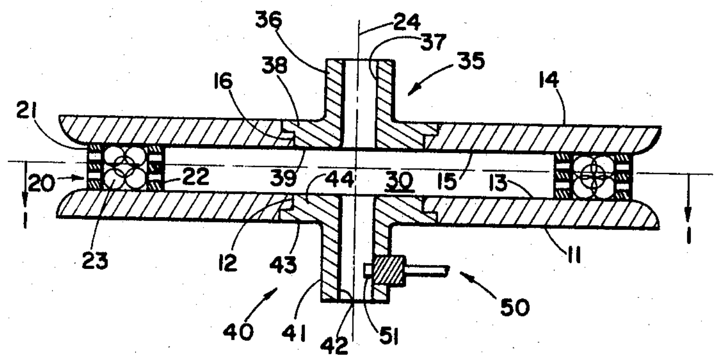

This and other objects of the invention will become apparent from a study of the accompanying specification and figures in conjunction with the drawings in which:

FIGURE 1 is a schematic cross sectional view of a vortex rate sensor taken along the lines 1—1 of FIGURE 2; and FIGURE 2 is a cross sectional view of a vortex rate sensor taken along lines 2—2 of FIGURE 1; and FIGURE 3 is an enlarged cross sectional view on a fluid flow sensor taken along lines 3—3 of FIGURE 1; and FIGURE 4 is an enlarged cross sectional view of the fluid flow sensor taken along lines 4—4 of FIGURE 3.

Referring now to FIGURE 1, reference numeral 10 generally depicts a vortex rate sensor. A generally cylindrical plate element 11 is provided having a central aperture 12 of circular cross section therein. Referring to FIGURE 2, plate element 11 has a plane surface 13 thereon. A second generally cylindrical plate element 14 is provided having a plane surface 15 thereon. Plate element 14 has a central aperture 16 of circular cross section therethrough.

Reference numeral 20 depicts a ring-shaped, annular, or cylindrical porous coupling means. Coupling means 20 comprises a generally cylindrical outer screen element 21 and a generally cylindrical inner screen member 22. It will be noted that inner screen element 22 has a slightly smaller diameter than the outer element 21. Positioned between inner screen 22 and outer screen 21 are a plurality of glass balls 23 which are very small in diameter, on the order of .015 inch. It is clear that coupling means 20 is porous in nature and allows fluid to pass therethrough with a minimum of restriction. The applicant does not wish to be limited to the particular coupling means illustrated in FIGURE 1; other suitable porous coupling means may be utilized for example sintered metals, ceramics, or the like.

Cylindrical coupling means 20 is positioned between plane surface 13 of plate element 11 and plane surface 15 of plate element 14 thereby maintaining plane surfaces 13 and 15 in a spaced parallel relationship. The axis of the cylindrical coupling means 20 is identified by reference numeral 24.

Plate elements 11 and 14 in conjunction with coupling means 20 collectively define a vortex chamber 30. The outer periphery of the chamber 30 is defined by inner screen element 22. The ends of cylindrical chamber 30 are defined by the plane surface 13 of plate element 11 and the plane surface 15 of plate element 14.

A first exit member 35 is provided. Exit member 35 comprises a tube or fluid conduit 36 having a generally cylindrical bore or passage 37 therethrough. The applicant does not wish to be limited to a cylindrical passage, other configurations are within the scope of this invenion. Conduit or tube 35 has an external flange portion 38 on one end thereof. The flange portion 38 is positioned within the aperture 16 of plate element 14 such that the bore 37 of exit member 35 is positioned substantially coaxial with axis 24. However, other configurations of the vortex rate sensor in which the exit passage is deliberately offset from axis 24 (not coaxial) to take advantage of the flow characteristics may be utilized. An end surface 39 of exit member 35 is positioned so as to lie in the same plane as the plane surface 15 of plate element 14. Exit member 35 is rigidly attached to plate 14 by suitable means (not shown) such as adhesives or screws.

The second exit member 40 is also provided. Exit member 40 comprises a tube or fluid conduit 41 having a generally cylindrical bore or passage 42 therethrough. The applicant does not wish to be limited to a cylindrical passage, other configurations are within the scope of the invention. Conduit or tube 41 has a flange portion 43 on one end thereof. The flange portion 43 is positioned within the aperture 12 of plate element 11 such that the bore 42 of exit member 40 is positioned substantially coaxial with axis 24. However, other configurations of the vortex rate sensor in which the exit passage is deliverately offset from axis 24 (not coaxial) to take advantage of the flow characteristics may be utilized. An end surface 44 of exit member 40 is positioned so as to lie in the same plane as the plane surface 13 of plate member 11. Exit member 40 is rigidly attached to plate member 11 by suitable means (not shown) such as adhesives or screws.

It should be noted that vortex rate sensor 10 may be constructed with only a single exit member, if so desired. For example, exit member 35 could be eliminated and all of the fluid exhausted out bore 42 of exit member 40.

A streamline element 51 having a symmetrical airfoil cross section is positioned within the bore 42 of exit member 40. It will be noted that streamline element 51 is positioned within bore 42 substantially parallel to axis 24 of coupling means 20 in the embodiment illustrated. It should be pointed out that it is desirable in some applications to align streamline element 51 at a definite predetermined angle with axis 24. Stated otherwise, it is sometimes desirable in order to obtain a useful signal to align the streamline element at a definite angle with the longitudinal axis of the passage. Two pressure ports 53 and 54 are positioned contiguous streamline element 51, one pressure port being located on each side of streamline element 51. Pressure ports 53 and 54 are in communication with bore 42 of exit member 40 at one end and are connected to a differential pressure sensor (not shown) at the opposite end.

In practice, streamline element 51 is attached to a mounting means 52. Pressure ports 53 and 54 are also contained wthin mounting means 52. However, other means may be utilized to locate streamline element 51 and pressure ports 53 and 54 relative to bore 42, and mounting means 42 constitutes no part of the present invention.

With reference to FIGURE 4, streamline element 51 is positioned within a suitable recess in mounting means 52. Pressure ports 53 and 54 are located on each side of streamline element 51 within mounting means 52. Pressure ports 53 and 54 are in communication with bore 42 at one end and the opposite ends terminate at output fixtures 55 and 56 respectively. Suitable pressure lines 57 and 58 are connected to the output fixtures 55 and 56 respectively to connect the pressure ports 53 and 54 to a suitable differential pressure sensor (not shown).

*Operation*

In operation, a pressure differential exits between coupling means 20 and bores 37 and 42 of exit members 35 and 40 respectively. Consequently a fluid flows through coupling means 20, through chamber 30 and exhausts through bores 37 and 42. In the absence of any input (angular velocity of the vortex rate sensor), the fluid flow has only radial velocity as illustrated by vectors $V_r$ in FIGURE 1; this radial flow is described by those skilled in the art as a pure sink flow. It can be shown that the radial velocity of the fluid at any particular point in the vortex chamber 30 outside of the sink is described by the formula:

$$V_r\left(\frac{m}{2\pi\rho}\right)\frac{1}{r}$$

where $m$ is the mass flow per unit height of chamber 30, $\rho$ is the fluid density, and $r$ is the radius from the axis 24 to the point of interest. It is clear from the formula that the radial velocity of the fluid increases as it approaches the sink (bores 37 and 42).

When the vortex rate sensor is subjected to an input rate, that is an angular velocity $\omega$ about the axis 24, the fluid which is flowing through coupling means 20 is given a tangential or rotational velocity as illustrated by vectors $V_t$ in FIGURE 1. A flow field of tangential or rotational velocity only is referred to by those skilled in the art as a pure vortex flow. The tangential or rotational velocity of the fluid at any point is given by the formula:

$$Vt\frac{\omega R_a^2}{r}$$

where $\omega$ is the input rate or angular velocity about axis 24, $R_a$ is the radius of chamber 30, and $r$ is the radius to the point of interest. It is clear from the above formula that the tangential or rotational velocity increases as the fluid approaches the sink (bores 37 and 42) This is explained as an application of the principle of converation of momentum.

The superposition of a pure vortex flow upon a pure sink flow results in a combined vortex-sink flow. The streamline pattern of the fluid in the combined vortex-sink flow is a logarithmic spiral as identified in FIGURE 1 by reference symbol $V_c$. The fluid flow within chamber 30 and outside of the sink is generally parallel to the plane surfaces 15 and 13.

As the fluid flowing in the logarithmic spiral flow pattern reaches the sink it flows out of chamber 30 through bores 37 and 42. The bores 37 and 42 are substantially coaxial with axis 24 and thus substantially perpendicular to the plane of the fluid flow in chamber 30 outside of the sink. Thus, the fluid flow leaves the chamber 30 through bores 37 and 42 at 90° from its original plane of flow. This results in a fluid flow pattern in the form of a helix in bores 37 and 42. That is to say, there is a component of the fluid flow having a longitudinal velocity parallel to axis 24 and a component of the fluid flow having a rotational velocity perpendicular to axis 24. The helix flow pattern in bores 37 and 42 is analogous to the flow pattern behind a propeller.

It should be noted that a component of the fluid flow within bores 37 and 42 perpendicular to the axis 24 is indicative of the input rate $\omega$. The tangential or rotational velocity $V_t$ imparted to the fluid within coupling means 20 appears in the bores 42 and 37 as a component of fluid flow having a velocity perpendicular to axis 24 and spaced therefrom. As pointed out earlier, the magnitude of the tangential or rotational velocity has been amplified within the vortex rate sensor. Consequently, it is possible to sense the input rate $\omega$ by determining the magnitude of the tangential component of the fluid flow.

The applicant has provided a unique fluid flow sensor, the utilization of which results in heretofore unobtainable levels of sensitivity, accuracy, and reliability. The applicant's unique fluid flow sensor allows clean flow of the fluid, that is, it does not induce flow separation and the resulting vortices which would result in unsteady fluctuations and high aerodynamic noise levels in the output signal. This is accomplished by the applicant by providing a streamline element positioned within the fluid flow and sensing the pressure differential existing across the streamline element. In one particular embodiment, the applicant utilizes a streamline element 51 having a cross section in the form of a symmetrical airfoil. By utilizing such a streamline element the pressure distribution existing on each side of the symmetrical airfoil resembles a basic flow pattern and is therefore amenable to theory. In this way the optimum dimensions of the streamline element 51 can be found as a function of the flow variables and all of the geometric parameters. In addition, it is possible to establish the optimum dimensions and location of pressure ports 53 and 54 in order to obtain a maximum signal level and a minimum time lag. With the optimum dimensions established it is possible to have repeatability between various models of the unique fluid flow sensor and variations in calibration are substantially eleminated. The unique fluid flow sensor disclosed by the applicant may be utilized in numerous instruments, however its operation will be described with reference to the vortex rate sensor.

With reference to FIGURE 3, the chord length of symmetrical airfoil element 51 is indicated by the dimension *c*. It will be noted that symmetrical airfoil element 51 is positioned within bore 42 such that the chord of the airfoil is substantially parallel to axis 24. The length of pressure ports 53 and 54 is indicated by the dimension *d* and the width of pressure ports 53 and 54 is illustrated by the dimension *e*. The semispan length of element 51 is indicated by the dimension *b* in FIGURE 4. The semispan length is measured perpendicular to the axis 24. The profile thickness of streamline element 51 is indicated by dimension *t*.

The applicant has determined suitable dimensions of the particular embodiment of the fluid flow sensor illustrated. The dimensions for the symmetrical airfoil illustrated in FIGURES 3 and 4 are as follows: the semispan length $b=2/3R_i$, where $R_i$ equals the radius of bore 42; the chord length $C=4/3R_i$; the ratio of the profile thickness to the chord length $t/c=1/6$; the ratio of the length of pressure ports 53 and 54 to the chord length $d/c=2/3$; the ratio of the width of the pressure ports 53 and 54 to the chord length $e/c=1/6$. It should be pointed out that these particular dimensions are applicable only to the symmetrical airfoil form illustrated. The applicant does not wish to be limited to the symmetrical airfoil illustrated and other streamline forms are within the scope of the applicant's invention. The dimensions disclosed above may be varied as the fluid flow is altered and the geometric parameters are changed. The applicant does not wish to be limited to the location or to the particular rectangular cross section illustrated for pressure ports 53 and 54, other locations and forms of pressure ports may be utilized. The size of the pressure ports is a function of the time lag of the fluid flow sensor and thus will change from application to application.

At a null condition (no input rate) the fluid flow in chamber 30 is a pure sink flow, that is the fluid in chamber 30 has only radial velocity. At a null condition, the fluid flow in bores 37 and 42 is longitudinal only, that is the fluid has only a longitudinal velocity parallel to the axis 24. When the fluid flow is parallel to the axis 24 the pressure on each side of streamline element 51 as viewed in FIGURE 3 is substantially equal. Therefore pressure port 53 and pressure port 54 both sense substantially equal pressures. Since the pressure ports 53 and 54 are connected to a differential pressure sensor it is clear that there will be no output signal from the fluid flow sensor 50 when the fluid flow is parallel to the axis 24.

When the vortex rate sensor is subjected to a rate input about the axis 24, the fluid flow through bores 37 and 42 is in the form of a helix. As the flow through the bore 42 follows a helical pattern, the fluid impinges upon streamline element 51 as illustrated by arrow 60 in FIGURE 3 at a particular helix angle $\phi$. The helix angle $\phi$ at which the fluid impinges upon streamline element 51 may be determined by the formula:

$$\text{Tangent } \phi=\frac{\omega R_i 2\pi\rho R_a^2}{mh}$$

where $m$ equals the mass flow per unit height of chamber 30, $\rho$ equals the mass density of the fluid, $h$ equals the distance between plane surfaces 13 and 15 of plates 11 and 14, $\omega$ equals the input rate or angular velocity, $R_a$ equals the radius of coupling means 20 and $R_i$ equals the radius of bore 42. Thus it is seen that the helix angle $\phi$ is a function of the input rate $\omega$, if the mass rate of flow is maintained constant.

The fluid flowing in bore 42 before impinging upon streamline element 51, has a certain pressure referred to as a free stream pressure. As the fluid flow impinges upon streamline element 51 at a particular helix angle $\phi$, a differential pressure exists across streamline element 51. More specifically, fluid impinging upon streamline element 51 at an angle $\phi$ as indicated by arrow 60 in FIGURE 3 results in a positive pressure (relative to the free stream pressure) at pressure port 54 and a negative pressure (relative to the free stream pressure) at pressure port 53. The magnitude of the pressure differential between pressure ports 54 and 53 is a function of the helix angle $\phi$ at which the fluid impinges upon streamline element 51 if the mass flow is maintained constant. The helix angle $\phi$ at which the fluid impinges streamline element 51 is a function of the input rate $\omega$ of the vortex rate sensor. Consequently, the pressure differential between pressure ports 54 and 53 is indicative of input rate $\omega$ to the vortex rate sensor. Stated otherwise, the pressure differential between pressure ports 54 and 53 is indicative of the tangential component of fluid flow in the bore 42, which is perpendicular to the chord of streamline element 51 and perpendicular to axis 24 and spaced therefrom.

The applicant has provided a unique fluid flow sensor in which a streamline element is positioned within a fluid flow field and suitable pressure ports are provided contiguous the streamline element so as to provide an output signal indicative of the tangential component of the fluid flow. When the unique fluid flow sensor is utilized in a vortex rate sensor, the output signal is indicative of the input rate to the vortex rate sensor.

While I have shown and described a specific embodiment of this invention, further modification and improvements will occur to those skilled in the art. I desire to be understood therefore that this invention is not limited to the particular form shown and I intend in the appended claim to cover all modification which do not depart from the spirit of the scope of the invention.

What I claim is:

1. In a vortex rate sensor: a first element having a plane surface thereon, said first element having an opening therethrough; a second element having a plane surface thereon, said second element having an opening therethrough; a right circular cylindrical porous coupling means positioned between said plane surface of said first element and said plane surface of said second element thereby maintaining said plane surface of said first element and said plane surface of said first element substantially parallel, said coupling means having a central axis; a first exit tube positioned within said opening in said first element coaxial with said axis of said coupling means; a second exit tube positioned within said opening in said second element coaxial with said axis of said coupling means, the rate sensor being adapted to be connected to a fluid source whereby a fluid flows from said source through said coupling means, between said first element and said second element, and exhausts through said first and said second exit tubes; a streamline element having a symmetrical airfoil cross section positioned within the passage of said first exit tube with the chord of said streamline element substantially parallel to said axis, said streamline element having a semispan length which is less than the radius of said passage, said streamline element having a chord length substantially double said semispan length, said streamline element having a profile thickness of less than 15 percent of the chord length; and two pressure ports located within said first exit tube, one of said pressure ports being positioned on each side of said streamline element, said pressure ports having an axial extent of less than 60 percent of the chord length of said streamline element.

2. In a vortex rate sensor: a first element having a first plane surface thereon and having an opening therethrough; a second element having a second plane surface thereon; annular porous coupling means having substantially parallel end faces positioned between said first plane surface and said second plane surface thereby forming a cylindrical chamber having a central axis, said axis of said chamber being substantially perpendicular to said first plane surface and said second plane surface; and exit tube positioned within said opening in said first element substantially parallel to said axis, the rate sensor being adapted to be connected to a fluid source whereby a fluid flows from said source through said coupling means, through said chamber, and exhausts through said exit tube; a streamline element having a generally symmetrical airfoil cross section positioned within the passage of said exit tube substantially parallel to said axis, said element having a semispan length which is less than the radius of said passage, said element having a chord length substantially double said semispan length; and two pressure ports located within said exit tube, said pressure ports having an axial extent of less than about 20 percent of said chord length, said pressure ports being located on opposite sides of said streamline element.

3. A pickoff means for a fluid vortex rate sensor having an inlet means and an outlet passage having a central axis therein and having means for causing fluid to flow therethrough, comprising: a streamline element having a generally symmetrical airfoil cross section positioned within said passage substantially parallel to said axis of said passage, said element having a semispan length which is less than the radius of said passage, said element having a chord length substantially double said semispan length, said element providing a pressure distribution along the chord length thereof when fluid flow impinges upon said element at an angle relative to the axis of said passage whereby the maximum pressure differential across said element is located within a specific area extending along the axial extent of said element; and two pressure ports in communication with said passage, one of said pressure ports being positioned on each side of said element so as to lie within said area, the magnitude of the pressure differential between said pressure ports being indicative of the magnitude of the component of fluid flow within said passage perpendicular to said axis.

References Cited by the Examiner

UNITED STATES PATENTS

| | | | |
|---|---|---|---|
| 2,203,824 | 6/1940 | Kollsman | 33—204.3 |
| 2,215,447 | 9/1940 | Kollsman | 33—204.3 |
| 2,337,921 | 12/1943 | Petroe | 73—213 |

OTHER REFERENCES

Weber et al., Physics for Science and Engineering, McGraw-Hill, New York, 1957, pages 157–158 (copy in Scientific Library).

Pengelley, Flow in a Viscous Vortex, Journal of Applied Physics, January 1957, vol. 28, No. 1, pages 86–92 (copy in Scientific Library).

RICHARD C. QUEISSER, *Primary Examiner.*

ROBERT EVANS, S. FEINBERG, *Examiners.*

S. C. SWISHER, L. L. HALLACHER, R. F. STAHL, *Assistant Examiners.*